July 16, 1963 W. R. THOMPSON 3,097,520
REDUCING THERMAL UPSETS IN FLUID MEASURING CELLS
Filed March 10, 1960 2 Sheets-Sheet 1

INVENTOR.
WILMER R. THOMPSON
BY Thomas L. O'Brien
ATTORNEY

July 16, 1963   W. R. THOMPSON   3,097,520
REDUCING THERMAL UPSETS IN FLUID MEASURING CELLS
Filed March 10, 1960   2 Sheets-Sheet 2

TIME FROM SAMPLE INJECTION

TIME FROM SAMPLE INJECTION

INVENTOR.
WILMER R. THOMPSON
BY
ATTORNEY

United States Patent Office 3,097,520
Patented July 16, 1963

3,097,520
REDUCING THERMAL UPSETS IN FLUID
MEASURING CELLS
Wilmer R. Thompson, South Charleston, W. Va., assignor to Union Carbide Corporation, a corporation of New York
Filed Mar. 10, 1960, Ser. No. 14,138
7 Claims. (Cl. 73—27)

This invention relates to a method and device for eliminating thermal upset in the measuring cells of fluid analyzers.

The method and device of this invention are described in connection with a gas chromatographic analyzer but it is to be understood that this invention may be used advantageously with other types of fluid analyzing devices. In order to explain this invention, a rather brief discussion of a measuring technique employing gas chromatography is presented.

Gas chromatography is a special variation of the general technique of separating the components of a mixture by flushing a sample of the mixture with a suitable carrier gas, such as hydrogen or helium, past a stationary phase of absorbent material for which the components of the mixture have varying absorption affinities.

The components of the sample are separated and issue in bands from the stationary phase mixed with the carrier gas. A detecting apparatus is used to determine the concentration of the various components as they issue.

A common method employed to determine the concentration of the various components is to pass the components through a measuring cell which contains an electrically energized, current carrying temperature sensitive transducer element. The transducer is coupled to a suitable measuring device, usually a bridge type circuit, which relates the electrical behavior of the transducer to the concentration of the component within the cell.

Typical transducer elements which may be satisfactorily employed in a measuring cell for this purpose are thermistors, thermal conductivity filaments and catalytic combustion filaments. All of these elements are electrically resistive in nature and the value of electrical resistance which they exhibit is dependent upon the temperature of the environment in which they are located.

Although all these elements are electrically resistive in nature, they possess individual characteristics which determine the type of element to be employed in a particular measuring operation.

For example, the thermistor has a negative coefficient of resistance, that is, its resistance decreases with a change in temperature of its environment. The thermistor is very sensitive to changes in temperature and is often employed in conjunction with fluid measuring cells.

The thermal conductivity filament has a positive coefficient of resistance, that is, its resistance increases with a change in temperature. It is generally not as sensitive as a thermistor, but is suitable for many types of measurements.

The catalytic combustion filament, when used in a fluid measuring cell, is energized with a value of electrical current so that it is at a temperature above the combustion temperature of the gas components to be measured. When a gas component enters the measuring cell it is ignited and the energy released in this process produces an increase in temperature within the cell and a corresponding increase in the resistance of the catalytic combustion filament. A limitation to the use of this element is that it may be used only in the measurement of combustible gases and fluids.

When temperature sensitive transducers, of the type described hereinabove, are used in a measuring cell for the purpose of determining the concentration of gas components, it is necessary to initially provide a reference environment within the measuring cell which will enable the transducer to function within its linear or unsaturated range of operation throughout the analysis.

This is generally accomplished by passing carrier gas through the measuring cell, at a rate of flow which is suitable to the particular gas mixture under analysis and by providing a suitable energizing current in the transducer. The carrier gas, which is flowing through the cell, passes over and around the electrically energized transducer and continuously removes the heat generated by electric current in the transducer. Due to the thermal conductivity of the carrier gas and its rate of flow, a definite temperature is established within the cell and a definite temperature gradient is established between the transducer and the measuring cell wall. Under these circumstances the transducer assumes a particular value of electrical resistance within its linear or unsaturated range of operation.

As the components of a sample of the fluid stream under analysis are separated and passed through the measuring cell, admixed with carrier gas, the temperature within the cell changes. The temperature within the cell, at a given time, is dependent on the thermal conductivity of the fluid therein, which, in turn, is a function of the concentration of the component in the cell.

The transducer assumes different values of electrical resistance for the different temperatures within the cell and thus provides a measurement of the concentration of the fluid component therein. Under normal circumstances, the components of the sample pass through the measuring cell at definite intervals in a mixture with the carrier gas. It is desirable that concentration measurements be limited to relatively low concentration components in order that the transducer need not assume resistance values greatly different from its reference value, particularly a value outside its normal operating range, since the temperature sensitive transducer, like many measuring elements, requires a finite period of time to return from such a value to its reference or equilibrium condition. Further, in most fluid stream analyses, it is only the concentration of the low concentration components that is of interest.

Occasionally, however, high concentration components pass through the measuring cell. These components, known generally as thermal upset components have concentrations higher than the desired limit and produce unusually high temperatures within the cell which cause the transducer to assume an abnormal value of resistance outside its linear or unsaturated range of operation. In addition these high concentration components cause the temperature of the measuring cell wall to change greatly. The equilibrium of the measuring cell is thereby destroyed and the measurement of subsequent components is prevented since a considerable period of time is required before the temperature of the cell wall returns to normal, and the transducer re-stabilizes and returns to its linear or unsaturated range of operation. In addition, when the transducer is a catalytic combustion filament, the high concentration component frequently causes a temperature within the cell which exceeds the lower explosive limit of the gas, and an explosion occurs, which, though of a minor character, causes damage to the cell and the transducer.

The undesirable condition caused by the high concentration components is known generally as thermal upset, and constitutes a serious and longstanding problem in the art of fluid analysis.

Previous attempts at solution of the problem provided means for diverting the high concentration component from the measuring cell. These methods were cumbersome and required complicated and expensive valve systems.

It is, therefore, an object of this invention to provide a simple method and device whereby the equilibrium of a fluid measuring cell may be maintained throughout the analysis of process streams by the elimination of thermal upset.

Another object of this invention is to provide a method for the determination of the presence of low concentration components in a fluid stream containing both high and low concentration components whereby this determination is accomplished undisturbed by thermal upset.

A still further object is to provide a simply constructed and easily adjustable device which will substantially eliminate the thermal upset effect incident to the operation of fluid measuring cells.

Other objects and a fuller understanding of the invention may be had by referring to the following description and appended claims taken in conjunction with the accompanying drawings.

In order to realize these objects, provision has been made for a series connection of a fixed value impedance and switch to be inserted in electrical parallel relationship with the temperature sensitive measuring transducer of fluid measuring cells.

Figure 1:
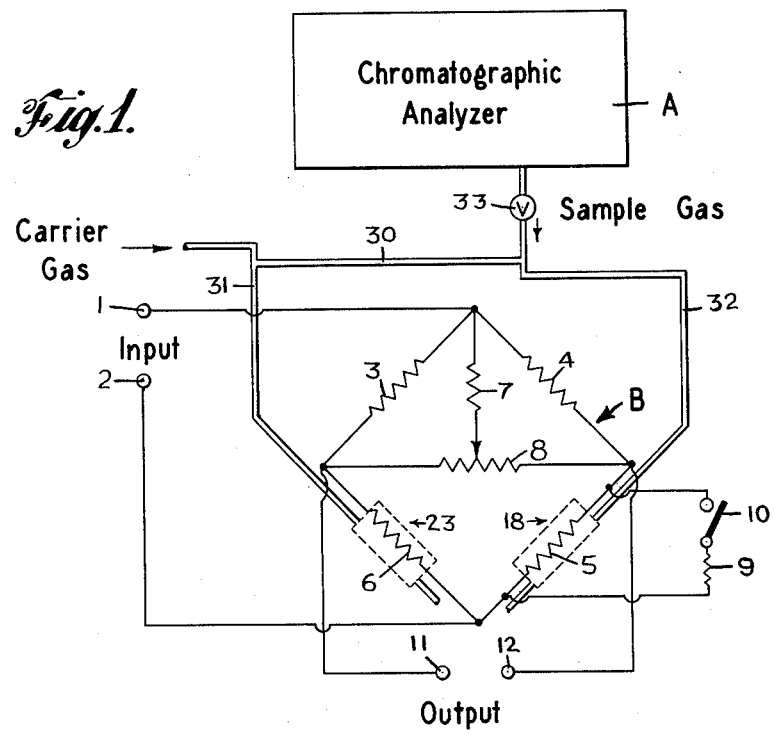
FIGURE 1 shows apparatus in which the invention may be incorporated.

With reference to the drawing, FIGURE 1 illustrates a gas chromatographic analyzer, indicated by reference character A, from which carrier gas and sample components may be conducted via conduits 30, 31 and 32 to measuring cell 18 and reference cell 23. The measuring and reference cells contain electrically energized, current carrying temperature sensitive transducers 5 and 6 which form part of the bridge detection circuit which is indicated generally by the reference character B.

The bridge circuit detector is energized by a suitable source of electrical energy which is applied at bridge input voltage terminals 1 and 2. The bridge circuit detector comprises resistive elements 3 and 4, which are of substantially equal electrical resistance and which largely determine the relative sensitivity of the bridge circuit. Temperature sensitive measuring transducer 5, and temperature sensitive reference transducer 6 form part of the bridge circuit and are chosen to have substantially identical electrical characteristics. Bridge span resistor 7 and balancing potentiometer 8 are incorporated in the basic bridge circuitry to provide a means of adjustment to compensate for minor variations in the electrical properties of the bridge circuit elements. The output signal of the bridge circuit is developed at bridge output terminals 11 and 12, and may be connected to a suitable recording device. Shunt resistor 9 and shunting switch 10 are connected in electrical series relationship and these elements are themselves connected in electrical parallel or shunting relationship with measuring transducer 5.

Figure 2:
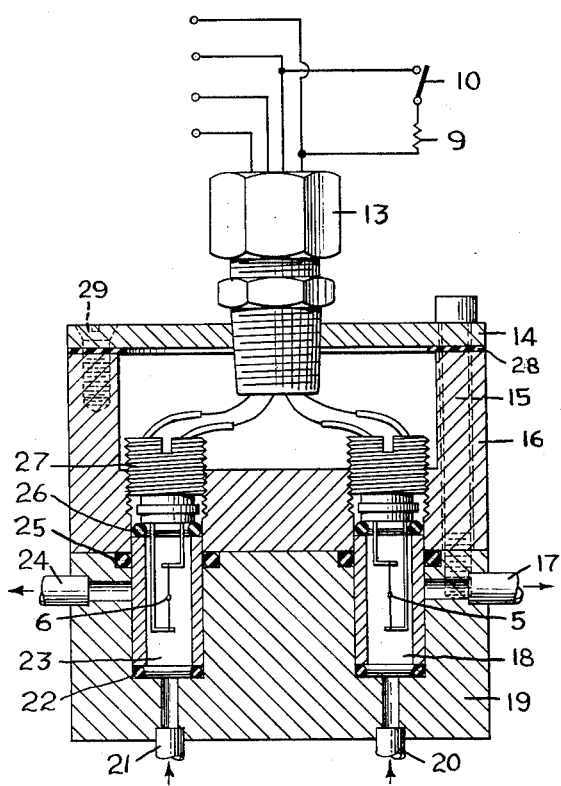
FIGURE 2 illustrates a cross-sectional view of a typical cell housing containing the transducer elements of the circuit of FIGURE 1, and illustrates the invention incorporated therewith.

A typical transducer cell housing containing a measuring cell 18 and a reference cell 23 is illustrated in FIGURE 2. Substantially identical transducer elements 5 and 6 are shown axially positioned in cells 18 and 23. These transducers are shown as thermistors, but thermal conductivity filaments, or catalytic combustion filaments may also be similarly employed. Tube adapter 13 provides access for electrical connections to the measuring and reference cells through cover plate 14 which is fixed to mounting block 16 by cover screw 29. Cap screw 15 rigidly fixes cover plate 14 and mounting block 16 to cell body 19.

Gasket 28 provides a gas tight seal between 14 and 16. Measuring cell 18 containing measuring transducer 5 is provided with gas inlet port 20 and gas outlet port 17. Similarly, reference cell 23 containing reference transducer 6 is provided with gas inlet port 21 and gas outlet port 24. O ring seals 22, 25, and 26 provide a gas tight seal for the reference and measuring cells. Gland 27 provides a mounting base for the transducers. Shunt resistor 9 and shunting switch 10 are connected in electrical series relationship and these elements are themselves connected in electrical parallel or shunting relationship with measuring transducer 5. Actuating means may be employed to provide automatic operation for switch 10.

Under normal operation conditions, the transducer cell housing, FIGURE 2, is mounted in a temperature controlled cabinet (not shown) where reference transducer 6 and measuring transducer 5 are maintained initially at approximately the same temperature. This temperature controlled cabinet serves to provide an ambient temperature for the transducer cell housing.

The bridge detection circuit is energized from a suitable voltage source which causes an electric current to flow through the elements of the bridge circuit. In order to establish the initial reference environment for the measuring apparatus a continuous flow of carrier gas, such as hydrogen or helium is passed via conduits 30, 31 and 32 to the reference and measuring cells 23 and 18 through gas inlet ports 20 and 21. The carrier gas passes over and around the transducers 5 and 6 at a suitable rate of flow and exhausts through the gas outlet ports 17 and 24. In passing through the measuring and reference cells the carrier gas continually removes heat from the transducers contained therein, which are at a temperature above the ambient of the cell due to the electrical current passing through them. In this manner, a definite reference temperature is established within the cells and the transducers assume substantially equal values of resistance. Under these circumstances the bridge circuit is at a null, or balanced condition and the temperature sensitive transducers assume values of resistance within their linear or unsaturated range of operation. If the bridge circuit drifts slightly from its balanced condition it may be re-adjusted to balance by means of balancing potentiometer 8. Valve 33 may now be opened and components of the sample gas separated in the gas chromatographic analyzer are passed through conduit 32 to the measuring cell at precise intervals, component after component. These components produce temperatures within the measuring cell proportional to their concentrations. These temperatures cause the resistance of the measuring transducer to vary from its reference value and a voltage signal is developed at the bridge output terminals 11 and 12. The nature of this voltage signal is an indication of the concentration of the component in the measuring cell.

When a particularly high concentration component flows into the measuring cell, the temperature within the cell immediately rises beyond the normal operating temperature of the transducer, thus producing a large and undesired change in cell equilibrium conditions. This undesirable effect is known generally as thermal upset.

However, the time at which the high concentration and other gas components enter and leave the measuring cell can be predicted with a high degree of accuracy by observation of the gas sample spectrum. In addition, the approximate concentrations of the high concentration components can be determined.

The present invention makes use of the predictable nature of this information to prevent thermal upset. This is accomplished by providing fixed value resistor 9 in electrical series relationship with switch 10; these series connected elements are connected in electrical parallel relationship with measuring transducer 5. Switch 10 is closed during the time interval when the high concentration component is passing through the measuring cell and opened after this component has passed through the cell. By operating the measuring cell in the above manner, part of the electric current is caused to by-pass measuring transducer 5 through shunt resistor 9 during the time the high concentration component is in the cell. This reduction of electric current through the transducer reduces the heat energy in the cell and prevents the high concentration component from producing an abnormally high temperature within the cell. The thermal equilibrium of the measuring cell is thus maintained and the cell is prepared to measure subsequent sample components. It is possible to predict the time interval at which the various sample components of a fluid stream will enter the measuring cell, and switch 10 may be programmed for automatic operation to open and close periodically in a sequence determined by the nature of the particular fluid stream under analysis.

The proper resistance value of the fixed resistor 9 is that value which causes the current to be reduced in the measuring transducer so that the transducer remains within its linear or unsaturated range of operation while the high concentration component is in the measuring cell. Since, at a given time, the temperature within the measuring cell is approximately porportional to the concentration of the component within the cell, and, since the heat energy dissipated by the transducer is proportional to the squared value of the current flowing through the measuring transducer, in order to maintain cell equilibrium it is necessary to reduce the current flowing through the measuring transducer, immediately prior to, or coincidentally with the entry of the thermal upset component into the measuring cell, approximately by the factor defined by the equation:

$$Kr \approx \sqrt{\frac{C_{T.U.}}{C_{max}}}$$

where $Kr$ is the factor by which the current in the measuring cell is to be reduced; $C_{T.U.}$ is the percent concentration of the thermal upset component; and $C_{max}$ is the maximum percent concentration which can be satisfactorily measured in the particular measuring cell. The factor defined above is approximate only, and in actual practice it has been found to be convenient to use that value of resistance for resistor 9 which, when connected in parallel relationship with the measuring transducer reduces the current flowing in the transducer so that the temperature of the measuring cell remains within about 1.5° C. of its reference value.

This value of resistance may be determined in a routine manner by connecting a variable resistor in parallel relationship with the measuring transducer, and, starting from a value of resistance approximately equal to the resistive impedance of the transducer, discretely increasing the value of the variable resistance until the limited temperature variation described hereinabove is achieved.

Illustrative of the invention is the example described below:

A gas sample mixture of vinyl acetylene in butadiene was injected into a gas chromatographic analyzer and separated into its components in the manner described hereinabove. It was desired to measure the concentration of vinyl acetylene in the gas sample mixture. It was determined from observation of the gas sample spectrum that the volume of butadiene in the mixture was greater than about 90 percent and would cause thermal upset in the measuring cell. It was also determined from observation of the gas sample spectrum that the time at which the thermally upsetting high concentration component, butadiene, would enter the cell was about three minutes and twenty seconds from the time of sample injection and that the butadiene component would remain in the measuring cell for about one minute and twenty seconds. A gas sample mixture of the vinyl acetylene in butadiene was then injected into the gas chromatographic analyzer and the separated components, admixed with carrier gas, were passed into a measuring cell and carrier gas was passed into a reference cell. These cells were of the type illustrated in FIGURE 2. The initial reference temperature of the cells was 50° C.

Detection circuitry, as illustrated in FIGURE 1 was used to determine component concentration. The values of the electrical elements which comprised the detection circuitry were as follows:

Bridge resistor 3 _____ 500 ohms.
Bridge resistor 4 _____ 500 ohms.
Balancing potentiometer 8 _____ 1000 ohms.
Span resistor 7 _____ 5000 ohms.
Measuring transducer 5 (thermistor) _____ Approximately 8000 ohms at 25° C.
Measuring transducer 6 (thermistor) _____ Approximately 8000 ohms at 25° C.

The bridge circuitry was energized by a voltage of 7.6 volts D.C. applied at input terminals 1 and 2.

The output terminals 11 and 12 of the bridge circuitry were connected to 0 to 1 millivolt potentiometric strip-chart recorder.

Shunt resistor 9 was 750 ohms. Shunting switch 10 was a switch located on the program timer of the gas chromatographic analyzer. This switch had an adjustable cam which allowed an on-off time span to be programmed for automatic switch actuation at any time during the analysis. The cam was adjusted so that switch 10 was closed during the time that the high concentration component, butadiene, was present in the measuring cell.

The results of the analysis were recorded in the form of bar graphs on the recorder which indicated the concentration of vinyl acetylene. The concentration of vinyl acetylene was less than 1000 p.p.m. by volume.

FIGURE 3 sets forth strip charts obtained in the analysis of the above-mentioned mixture of vinyl acetylene in butadiene.

Figure 3A:
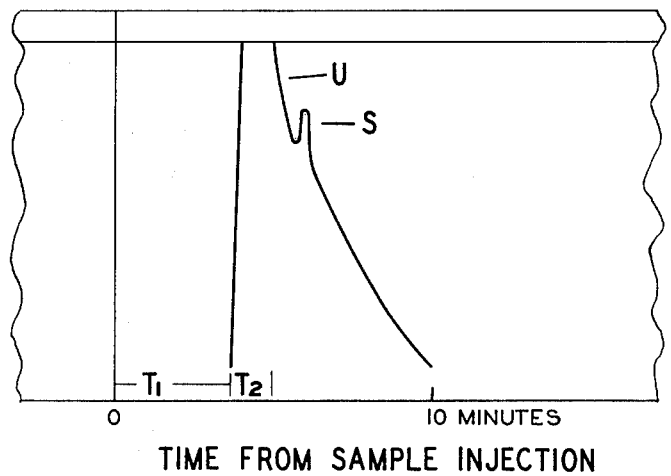
FIGURE 3 shows the recorded results of fluid stream analyses and illustrates the advantage of the present invention.

FIGURE 3(a) shows an analysis performed without the aid of the present invention. The interval $T_1$ represents the time from injection of the sample gas mixture into the chromatographic analyzer to the entry of the thermally upsetting component, butadiene, into the measuring cell. During the time interval indicated as $T_2$, the thermally upsetting component U was present in the measuring cell and caused thermal upset. This thermal upset condition prevented the measurement of subsequent sample component S, vinyl acetylene.

Figure 3B:
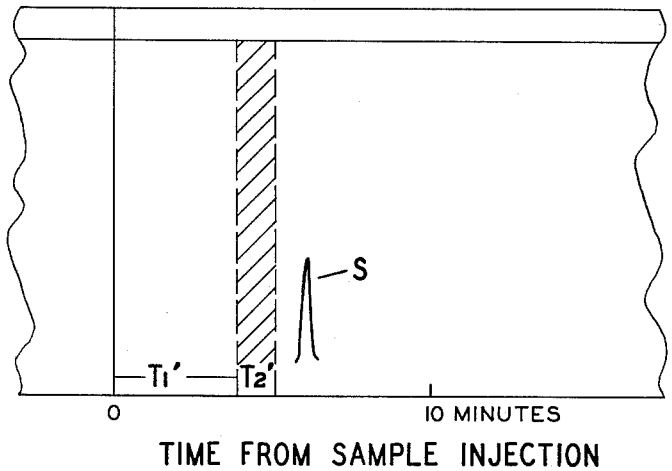

FIGURE 3(b) represents the analysis set forth in the above example.

The interval designated as $T_1'$ represents the time from injection of the sample gas mixture into the chromatographic analyzer to the entry of the thermally upsetting component, butadiene, into the measuring cell. During the time interval $T_2'$ that the thermally upsetting component was present in the measuring cell, switch 10 was closed and shunt resistor 9 was placed in parallel relationship with measuring transducer 5. In this manner, and in accordance with the present invention, the undesirable effect of thermal upset was eliminated and the concentration of subsequent low concentration component S, vinyl acetylene was readily measured.

Thus, it is clearly shown that this invention makes possible the continuous measurement of low concentration components of a fluid mixture by substantially eliminating the effect of thermal upset.

Although this invention has been described with a certain degree of particularity, it is understood that the present disclosure has been made only by way of example and that changes in the details of construction and the combination and arrangement of parts may be resorted to without departing from the spirit and scope of the invention as hereinafter claimed.

What is claimed is:
1. In the method of measuring the concentration of the low concentration components of a fluid mixture by separating said fluid mixture into substantially all its components by means of a chromatographic analyzer and successively passing all of said separated components through a measuring device, said measuring device comprising a measuring cell adapted to receive said separated components and an electrically energized, current carrying temperature sensitive transducer within said measuring cell, said transducer coupled to an electrical detecting means, said measuring device operable at a reference temperature and within a limited variation of said reference temperature and capable satisfactorily measuring the concentration of separated components which produce temperatures in said measuring cell within said limited variation, a separated component of a concentration sufficient to produce a temperature outside of said limited variation having the effect of thermally upsetting the equilibrium of said measuring device, the improvement which comprises reducing the current passing through said transducer prior to the entry of said thermally upsetting component into said measuring cell to a value such that the temperature within said measuring cell is maintained within approximately 1.5° C. of said reference temperature, and maintaining the current passing through said transducer at said reduced value until said thermally upsetting component passes out of said measuring cell.

2. A method according to that of claim 1 wherein the current flowing through the said temperature sensitive transducer is reduced periodically in a sequence determined by the nature of the fluid stream under analysis.

3. A method according to that of claim 1 wherein the current flowing through the said temperature sensitive transducer is reduced by shunting said transducer with an electrical impedance of substantially fixed value.

4. A method according to that of claim 1 wherein the current flowing through the said temperature sensitive transducer is reduced by shunting said transducer with an electrical resistance of substantially fixed value.

5. A method according to that of claim 1 wherein the current through the said temperature sensitive transducer is reduced by shunting said transducer with an electrical impedance of substantially fixed value in a sequence determined by the nature of the fluid stream under analysis.

6. A method according to that of claim 1 wherein the current through the said temperature sensitive transducer is reduced by shunting said transducer with an electrical resistance of substantially fixed value in a sequence determined by the nature of the fluid stream under analysis.

7. In the method of measuring the concentrations of the low concentration components of a fluid mixture by separating said fluid mixture into substantially all its components by means of a chromatographic analyzer and successively passing all of said separated components through a measuring device, said measuring device comprising a measuring cell adapted to receive said separated components and an electrically energized, current carrying temperature sensitive transducer within said measuring cell, said transducer coupled to an electrical detecting means, said measuring device capable of satisfactorily measuring the concentration of said separated components up to a limiting concentration, a separated component having a concentration greater than said limiting concentration having the effect of thermally upsetting the equilibrium of said measuring device, the improvement which comprises reducing the current through said transducer immediately prior to the entry of a said thermally upsetting component into said measuring cell by a multiplying factor, said multiplying factor approximately defined as the square root of the ratio of the concentration of said thermally upsetting component to said limiting concentration, and maintaining the current passing through said transducer at said reduced value until said thermally upsetting component passes out of said measuring cell.

References Cited in the file of this patent

UNITED STATES PATENTS

| | | |
|---|---|---|
| 1,691,600 | Brush et al. | Nov. 13, 1928 |
| 2,552,017 | Schwartz et al. | May 8, 1951 |
| 2,734,376 | Cherry et al. | Feb. 14, 1956 |
| 2,982,123 | Kindred | May 2, 1961 |

OTHER REFERENCES

"Vapor Fractometry (Gas Chromatography)," by H. H. Hausdorff. Published September 1955 by Perkin-Elmer Corporation in Norwalk, Conn. (pp. 5–11 relied on).